Nov. 2, 1937.  F. C. BEST  2,097,438
MOTOR VEHICLE
Original Filed Dec. 20, 1933   3 Sheets-Sheet 1
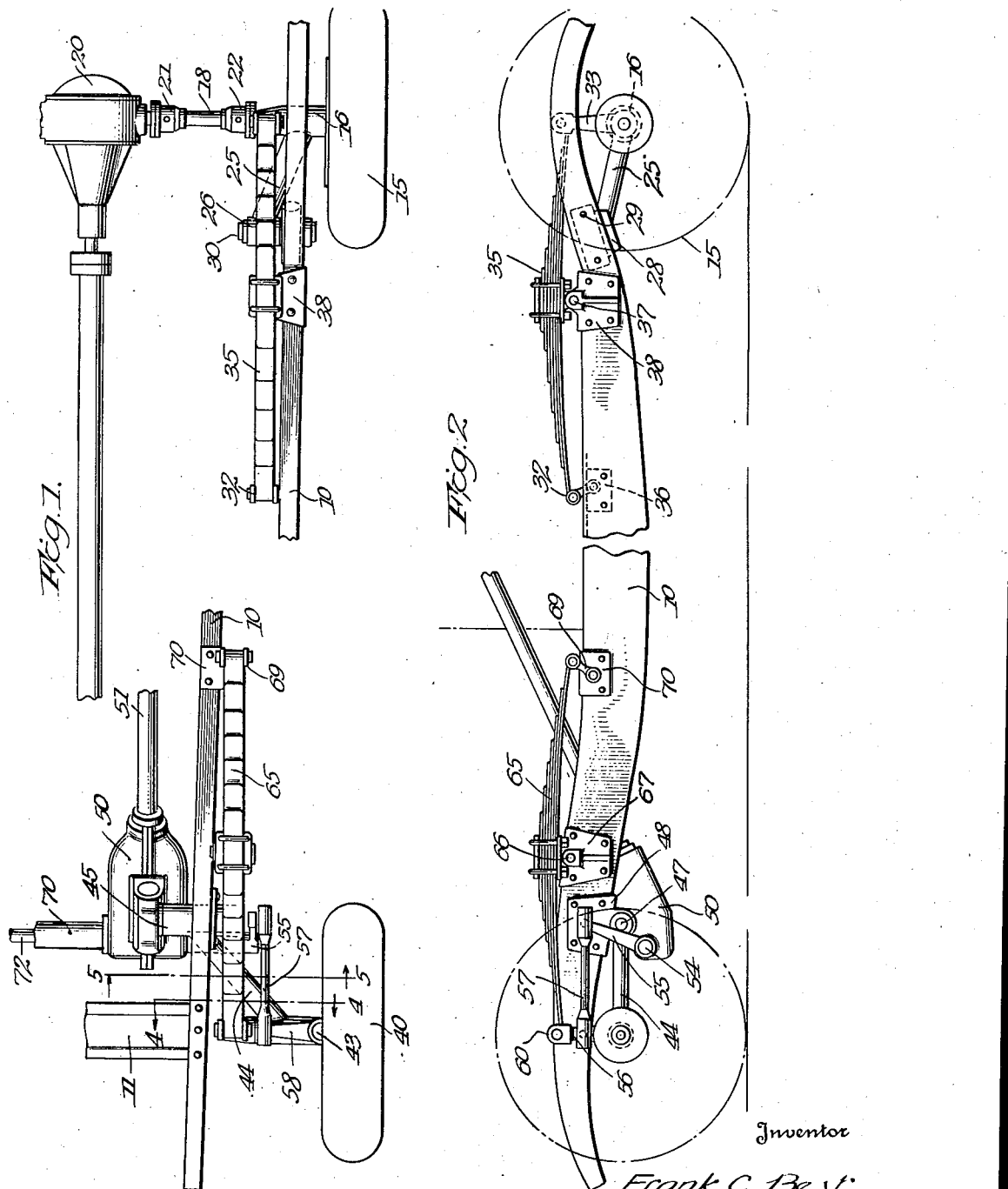
Inventor
Frank C. Best
By Watson, Coit, Morse & Grindle
Attorneys Nov. 2, 1937.   F. C. BEST   2,097,438
MOTOR VEHICLE
Original Filed Dec. 20, 1933   3 Sheets-Sheet 2
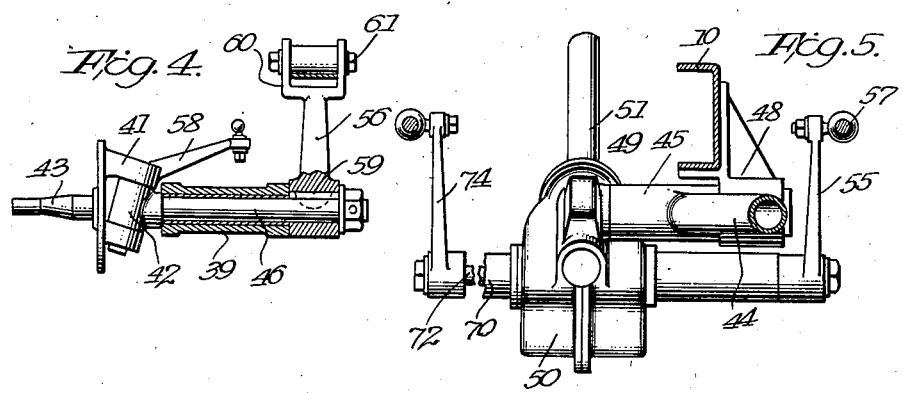
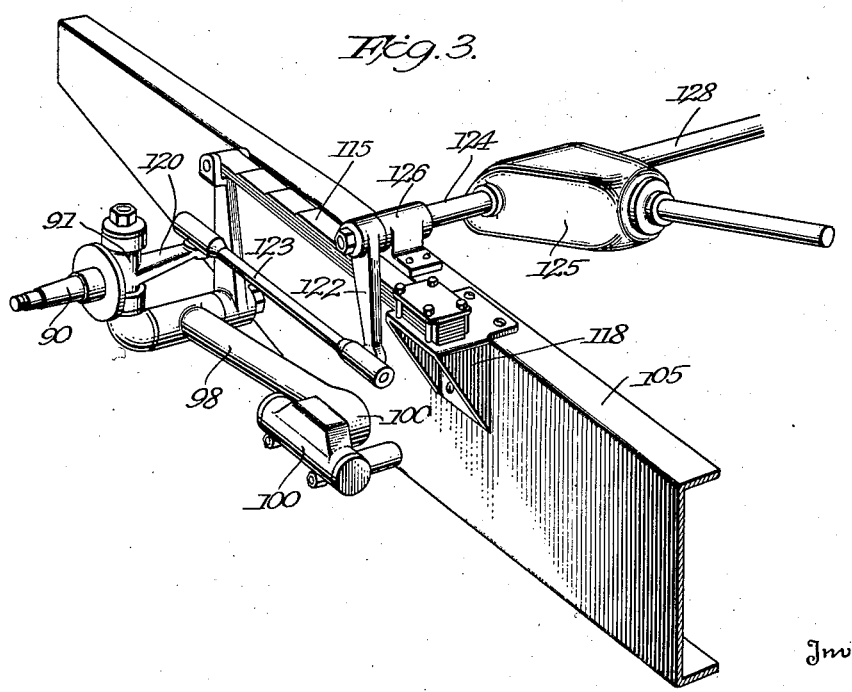
Inventor
Frank C. Best
By Watson, Coit, Morse & Grindle
Attorneys Nov. 2, 1937.   F. C. BEST   2,097,438
MOTOR VEHICLE
Original Filed Dec. 20, 1933   3 Sheets-Sheet 3
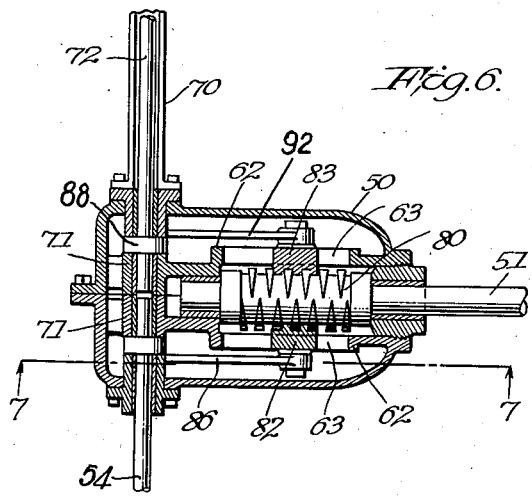
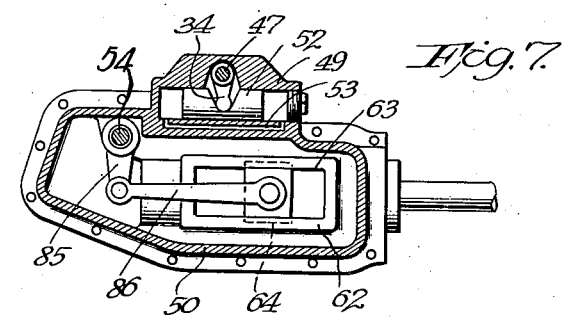
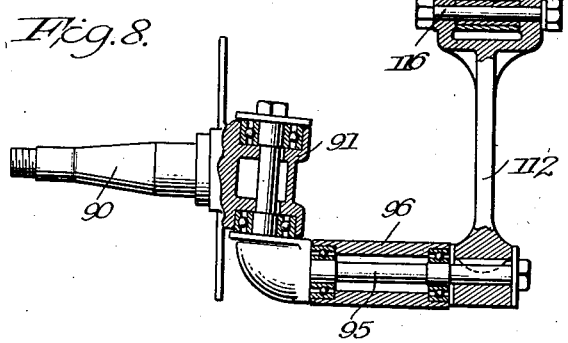
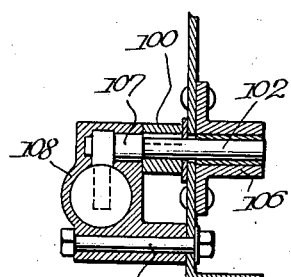
Inventor
Frank C. Best
By Watson, Coit, Morse & Grindle
Attorneys Patented Nov. 2, 1937

2,097,438

UNITED STATES PATENT OFFICE 2,097,438

MOTOR VEHICLE

Frank C. Best, Detroit, Mich., assignor to Packard Motor Car Company, Detroit, Mich., a corporation of Michigan Application December 20, 1933, Serial No. 703,306
Renewed July 7, 1937

8 Claims. (Cl. 280—124)

This invention relates to motor vehicles and more particularly to vehicles of the type in which the road wheels at opposite sides of the vehicle are suspended from the vehicle frame for rising and falling movement independently of each other. It is the principal purpose of the invention to provide a construction of this character which is both compact and sturdy and which is so associated with the frame that the latter may most effectively absorb the stresses resulting from the application of the normal load thereto and such stresses as may be developed in passing over an irregular road bed.

It is a feature of the invention that movement of the wheels is resisted by leaf springs, the high resistance of such springs to flexure being of importance in overcoming excessive sidesway of the vehicle body characteristic of many types of independent wheel suspensions and offering one of the principal obstacles to the adoption of such suspensions in this country.

It is a further object of the invention, as applied more particularly to the steerable road wheels of the vehicle, to provide steering mechanism therefor which will afford easy and positive steering control at all times, the mechanism being so constructed that no undesired displacement of the elements thereof occurs as the road wheels rise and fall with respect to the vehicle frame.

Further objects and features of the invention will be apparent from the following description taken in connection with the accompanying drawings, in which Figure 1 is a plan view of a portion of a motor vehicle chassis illustrating the application of the present invention thereto;

Figure 2 is a side elevation of the construction shown in Figure 1;

Figure 3 is a perspective view illustrating a modified form of the invention in the application thereof to one of the front steerable road wheels of a vehicle;

Figure 4 is a sectional view taken substantially on the line 4—4 of Figure 1;

Figure 5 is a sectional view taken on the line 5—5 of Figure 1;

Figure 6 is a sectional view on a transverse plane through a steering gear housing showing gearing suitable for use with either form of wheel suspension;

Figure 7 is a sectional view on the line 7—7 of the steering mechanism shown in Figure 6; and Figures 8 and 9 are sectional views of portions of the apparatus shown in Figure 3.

In order to facilitate an understanding of the invention reference will be made herein to the preferred form thereof as illustrated in the drawings, and specific language will be employed to describe the several parts. It will nevertheless be understood that no restriction of the scope of the invention is thereby intended and that such changes and alterations in the illustrated form of the invention are contemplated as would occur to one skilled in the art to which the invention relates.

Referring more particularly to the drawings, the vehicle frame is shown as comprising the usual side frame members 10 and a cross frame member 11, the latter extending between and being secured to the side frame members in any conventional manner. The wheel suspension is similarly constructed at opposite sides of the vehicle frame and in the following description reference will be made principally to the parts at the left-hand side on which side the major portion of the steering mechanism is shown.

Dealing first with the application of the invention to the rear drive wheels of the vehicle, it will be observed that the road wheel 15 is supported for rotation in the conventional manner within a tubular housing 16, and is driven by means of a sectional shaft 18 extending through the housing 16 from differential gearing enclosed in a housing 20, the latter being secured rigidly to a rear cross frame member, not shown. Universal joints 21 and 22 are interposed between the several sections of the shaft 18 to permit rising and falling movement of the road wheel with respect to the vehicle frame and the differential housing 20 without interrupting the drive to the road wheel, these joints permitting relative angular movement as well as relative longitudinal displacement of the several sections of the shaft 18 in a manner which is well understood.

The wheel supporting housing 16 is carried by an arm 25 which is rigidly secured to or formed integrally with the housing 16 and which is provided with a hub portion 26, the latter being supported on the vehicle side frame member 10 for swinging movement about an axis extending transversely of the frame. For instance, a shock absorber housing 28 may be secured to the side frame member 10 as at 29, and the hub portion 26 of the wheel supporting arm 25 may be secured rigidly to a shaft 30 extending through and journalled for rotation in the shock absorber housing 28.

The specific mechanism incorporated in the shock absorber housing 28 forms no important part of the invention, but it is preferred to employ the conventional mechanism of the hydraulic type in which rocking of the shaft 30 about the axis thereof serves to produce flow of fluid through passages of a more or less restricted nature, whereby movement of the shaft 30, the arm 25, and the associated road wheel assembly is damped.

The wheel supporting housing 16 is further provided with an upstanding arm 33, preferably formed integrally with the housing and connected at the upper end thereof with the rearward end of a leaf spring assembly 35. As illustrated in the drawings this spring assembly is of the cantilever type, the central portion of the spring being secured to a trunnion 37 which is journalled in a bracket 38 secured to the side frame member 10. The forward end of the spring assembly is connected to a bracket 36 on the side frame member by means of the conventional spring shackle 32.

The mode of operation of the wheel suspension just described will be apparent. When the road wheel 15 meets an obstruction it will rise in a substantially vertical plane, swinging about the axis of the shaft 30 of the shock absorber, the latter resisting and damping accelerative movement. Upward movement of the wheel is yieldingly resisted by the leaf spring assembly 35, and by reason of the construction and disposition of this spring the stress is carried to a point on the frame which is well forward of the rear end of the frame. Since the central portion of the frame as measured longitudinally thereof is secured rigidly to the vehicle body and is reinforced by the latter to a considerable extent, the frame is thus enabled to more effectively resist the stress carried through the spring and weaving of the frame is avoided. Furthermore, the leaf spring assembly, particularly when arranged as illustrated in the drawings, offers much more resistance to sidesway of the vehicle on rounding a curve at high speed than is offered by coil springs or even by leaf springs of other type applied in a different manner. For this reason the wheel suspension is particularly applicable to the support of the rear end of vehicles in which an independent suspension employing coil springs is provided at the forward end, such an arrangement being characterized by a maximum of elasticity in the spring suspension at the front end and by increased stability at the rear end, excessive sidesway being prevented.

The stability of this form of suspension is further increased by the fact that the cantilever type of spring is characterized by relatively low unsprung weight and since the differential gearing is carried by the vehicle frame, the unsprung weight of the entire suspension system is far less than that which obtains with the conventional rigid axle construction. Since the road wheels rise and fall in a vertical plane there is no lateral displacement of the wheels and consequently the wear on the tires is reduced to a minimum.

Referring now to the application of the invention to the front steerable road wheels of the vehicle as shown in Figures 1, 2, 4, and 5, it will be observed that the wheel suspension is quite similar to that hereinbefore described and is characterized by the same advantages. Thus each of the steerable road wheels 40 is carried in the usual manner by a steering knuckle 41, which may be formed integrally with the wheel spindle 43, the knuckle being journalled for swinging steering movement about a substantially vertical or nearly vertical axis on a wheel carrying member 42. The member 42 is extended inwardly to provide a shaft 46 and a sleeve 39 surrounds the shaft 46 and is rotatable freely thereon. The sleeve 39 is secured to or formed integrally with a wheel supporting arm 44 which is provided with a hub portion 45, the latter being in turn supported on the frame for rocking movement about an axis extending transversely of the vehicle. Thus as in the construction hereinbefore described, the hub portion 45 of the arm 44 may be secured rigidly to a shaft 47 which is journalled in a bracket 48 carried by the side frame member and which extends within a shock absorber housing 49, the mechanism within the housing serving to resist rocking movement of the shaft 47 and accordingly to damp rising and falling movement of the road wheel 40 in a manner well understood. For instance, the shaft 47 may be provided with an arm 34 operatively engaging a double ended piston 52, the latter serving when reciprocated to force fluid through a more or less restricted passage 53. It will be appreciated that other types of shock absorbing mechanism may be employed if desired, it being understood that the term "shock absorbing mechanism" as employed herein refers to devices for retarding rapid relative movement of the road wheels and frame such as is commonly employed in motor vehicles in addition to the usual spring suspension.

The shock absorber housing 49 is carried by and preferably formed integrally with a steering gear housing 50, the latter being located at the lower end of a steering column 51 and enclosing gearing operable through the column from the usual steering hand wheel to control steering movement of the road wheels. For convenience in assembling the steering gear housing, the latter may be split on a substantially vertical plane to provide separate portions which may be bolted together, one portion of the split housing only being formed integrally with the shock absorbing housing 49.

The gearing within the housing 50 is operatively connected with a shaft 54 extending within and laterally of the housing and rigidly connected with an upstanding arm 55. A link 57 is provided with an articulated connection with the arm 55 and with an arm 58 secured to or formed integrally with the steering knuckle 41, it being observed that the effective length of the link 57 is substantially equal to the effective length of the arm 44. In other words, if projections be made on a vertical plane perpendicular to the axes of shafts 46 and 47 of the link 57 and of the wheel supporting arm 44, these projections will be of substantially the same length and substantially parallel.

As with the construction designed more particularly for use with the driving wheels of the vehicle, the preferred form of the invention as applied to the steerable road wheels involves the employment of a leaf spring assembly to yieldingly resist the rising and falling movement of the wheels. This spring assembly, indicated at 65, is of the cantilever type and is secured intermediate its ends to a trunnion 66 journalled on a bracket 67 carried by the side frame member 10, the rear end of the spring being connected by means of a conventional spring shackle 69 to a bracket 70 likewise secured to the side frame member. The forward end of the spring is connected to the upper end of an arm 56, the latter being rigidly secured to the shaft 46 as indicated at 59 and provided with a yoke shaped portion 60 receiving the spring, a bolt 61 passing through the arms of the yoke shaped portion 60 affording a fulcrum for the spring.

The leaf spring 65 is so constructed and the points of connection thereof to the road wheel assembly and vehicle frame so disposed that the spring may be considered as though flexing about an axis intermediate the arm 56 and the trunnion 66, the extreme forward end of the spring describing a circular or nearly circular arc about this axis. Thus the spring 65 and the arm 44 form in effect a parallel link system supporting the road wheel, that portion of the spring lying forwardly of the axis hereinbefore referred to functioning substantially as a second link. Again, if the wheel carrying arm 44 and the forward portion of the spring be projected on a plane substantially perpendicular to the axes of the shafts 46 and 47, these projections will be substantially parallel and have substantially the same length. Thus as the road wheel rises and falls, no undesired steering movement is imparted to the wheel since there is no tendency to either shorten or lengthen the link 57 which functions as a third member of the parallel link system hereinbefore mentioned. Perfect steering is therefore obtained and shimmy of the wheels as the result of improper displacement of the elements of the steering mechanism is avoided.

The steering housing 50 may be secured to the adjacent side frame member in any convenient manner, and a housing (not shown) enclosing shock absorbing mechanism may be carried by the side frame member at the right-hand side of the vehicle. A tubular housing 70 preferably extends between and is rigidly secured to the steering housing and the oppositely disposed shock absorbing housing and thus constitutes a cross brace between the side frame members increasing the rigidity of the frame and of the steering mechanism. The housing 70 also encloses a shaft 72 extending within the steering gear housing 50 and across the vehicle frame to the right-hand side thereof, an upstanding arm 74, corresponding to the arm 55, being secured to the shaft 72. It will be appreciated that the arms 74 and 55 are connected in a similar manner to the respective steering knuckle arms of the adjacent road wheels and it is thus only necessary to impart simultaneous and corresponding movement to these two arms in opposite directions to effect conjoint steering movement of the road wheels at opposite sides of the vehicle. This function may be performed by gearing within the steering housing 50 and shown more particularly in Figures 6 and 7 of the drawings.

Thus the steering column 51 carries a worm 80 of the dual type, that is to say, the worm is provided with both right-hand and left-hand threads. Separate cam followers or nut elements 82 and 83 cooperate with the worm 80 at opposite sides thereof, the nut element 82 being so constructed as to engage in the left-hand threads only of the worm and the nut element 83 being constructed to engage in the right-hand threads only of the worm. The nut element 82 is connected to an arm 85 rigidly secured to the shaft 54 by means of a link 86 having articulated connection with each and a similar connection between the nut element 83 and the shaft 72 is afforded by the arm 88 and the link 92. Thus when the steering hand wheel is turned to the right, the nut 82 will be moved forwardly and the nut 83 will be moved rearwardly, the arms 55 and 74 being thus swung in opposite directions about the axes of their supporting shafts 54 and 72 to steer both road wheels toward the right.

In order that the nut elements 82 and 83 may be maintained in operative relationship with the worm 80, each part of the split steering gear housing 50 is preferably provided with a longitudinally extending web member 62. Each web member 62 has a substantially rectangular opening 63 therein in which the associated nut element is slidable, each nut element being provided with flange portions 64 engaging the adjacent inner face of the associated web member both above and below the body of the nut element. The web members 62 are preferably also formed to provide bearings 71 in which the shafts 54 and 72 are journalled to further strengthen the construction.

It will be appreciated that other forms of steering mechanism may be employed than that shown and described herein. Thus while a dual steering gear of the type shown is preferred for simplicity and convenience, conventional steering mechanism may be used and the road wheels connected for conjoint movement by a suitable linkage or gearing operatively associating the shafts 54 and 72 and arranged externally of the steering gear housing.

Referring now to the form of the invention shown in Figure 3 of the drawings, it will be observed that the wheel spindle 90 is carried by a steering knuckle member 91. The knuckle 91 is journalled for steering movement on a king pin or the equivalent thereof formed integrally with or rigidly secured to a horizontally disposed shaft 95. A sleeve 96 surrounds the shaft 95 and is journalled for rotation thereon, this sleeve being formed integrally with a wheel carrying arm 98 provided at its rearward end with a hub portion 100, the latter being secured for rotation with a shaft 102 extending through the side frame member 105 and journalled in a bearing block 106 secured to the inner face of the side frame member. The shaft 102 is further provided with a portion 107 extending within a shock absorber housing 108 and cooperating with mechanism enclosed within the latter to damp movement of the shaft 102, the wheel carrying arm 98, and the road wheel, this mechanism being similar to that described in connection with the form of the invention first referred to. The shock absorber housing 108 may be retained against rotation with respect to the vehicle frame by means of bolts 110 passing through the side frame member. The shaft 95 is non-rotatably connected at the inner end thereof with an upstanding arm 112, the latter having a yoke shaped portion 113 at its upper end in which a leaf spring assembly 115 is received and secured by means of a bolt 116, this leaf spring assembly being further secured at its rearward end to a bracket 118 which is in turn carried by the side vehicle frame member 105.

It will be observed that with the above construction the road wheel may rise and fall freely about the axis of the shaft 102, rising movement being yieldingly resisted by the leaf spring 115 and damping being effected by the shock absorber associated with the shaft 102. Longitudinal and torsional stresses applied to the road wheel are adequately resisted by the arm 98, these stresses being carried to the frame member through the bearing block 106. The construction is characterized by a minimum of unsprung weight, all such weight being located at a relatively low point with respect to the vehicle frame so that stability is increased.

The steering construction may be similar to that hereinbefore described, a steering knuckle arm 120 formed integrally with the steering knuckle 91 being connected with a steering arm 122 by means of a link 123 having articulated connection with both arms. The arm 122 is rigidly secured to a shaft 124 journaled in a bracket 126 carried by the side frame member 105 and extending within a steering gear housing 125. A transversely extending shaft 128 similarly associated with the steering gear housing 125 is associated with similar steering mechanism at the opposite side of the vehicle, and dual steering gear mechanism such as shown in connection with the first described form of the invention, may be located within the steering gear housing 125 to impart rotation in opposite directions to the shafts 124 and 128. If desired, the steering gear housing may be supported entirely by the last named shafts.

Perfect steering may be obtained by application of the principle heretofore suggested, the parts being so arranged that the projections of the effective end portion of the leaf spring assembly 115, the link 123, and the wheel carrying arm 98 on a plane perpendicular to the pivotal axes of the arm 98 are substantially parallel and of substantially the same length.

Having thus described the invention, what is claimed as new and desired to be secured by Letters Patent is:

1. In a motor vehicle, the combination with a vehicle frame, of a road wheel assembly, and means supporting said wheel assembly for rising and falling movement about an axis extending transversely of the frame, said means comprising a member carrying said wheel assembly, said member extending generally longitudinally of the vehicle toward the mid-portion of the frame and being journalled for rotation on the latter about a transverse axis, a longitudinally extending leaf spring assembly acting between said frame and said member to yieldingly resist rising and falling movement of the latter and of the wheel assembly, said spring assembly being connected to said frame on that side of the axis of rotation of said member remote from said wheel assembly, and a shock absorbing mechanism carried by said frame and including an operating shaft, said shaft being rigidly connected with said member to afford a fulcrum for the latter.

2. In a motor vehicle, the combination with a vehicle frame, of a steerable road wheel assembly, and means supporting said wheel assembly for rising and falling movement about an axis extending transversely of the frame, said means comprising a member carrying said wheel assembly, said member extending generally longitudinally of the vehicle toward the mid-portion of the frame and being journalled for rotation on the latter about a transverse axis, a longitudinally extending leaf spring assembly acting between said frame and said member to yieldingly resist rising and falling movement of the latter and of the wheel assembly, said spring assembly being connected to said frame on that side of the axis of rotation of said member remote from said wheel assembly and constituting with said member a wheel supporting system of the parallel link type, and steering mechanism for imparting swinging steering movement to said wheel assembly, said mechanism including an element movable with said wheel assembly, an element movably supported on said frame, and a link connecting said elements and having articulated connection with each, said link being so disposed as to constitute in effect a third member of said parallel link system.

3. In a motor vehicle, the combination with a vehicle frame, of a steerable road wheel assembly, a wheel carrying member pivotally connected with said road wheel assembly and said frame for swinging movement about parallel axes extending transversely of the frame, a generally longitudinally extending leaf spring assembly pivotally connected to said member, said spring assembly and member being disposed in vertically spaced generally parallel planes, said spring assembly being so connected to the frame that said member and spring assembly constitute in effect a parallel link system, and steering mechanism for said wheel assembly including an element movable with said wheel assembly, an element movable on said frame, and a link having articulated connection with said elements, the points of connection of said link with said elements being so disposed that the link constitutes a third member of the parallel link system.

4. In a motor vehicle, the combination with a vehicle frame, of a steerable road wheel assembly, an arm pivotally connected to said frame and wheel assembly about parallel axes extending transversely of the frame, a leaf spring pivotally connected to said arm and secured to said frame, the portion of said spring connected with said arm flexing about a transverse axis, the projections of the said portion of the spring and of the arm on a plane perpendicular to the axes of the arm being substantially parallel and of substantially the same length, and a steering link operatively connected to said wheel assembly, the projection of said link on the said plane being substantially parallel to and of substantially the same length as said first named projections.

5. In a motor vehicle, the combination with a vehicle frame, of steerable road wheels disposed at opposite sides of the frame, road wheel carrying members supporting said wheels for swinging steering movement, means supporting each of said members and the associated wheel for rising and falling movement with respect to the vehicle frame, said means comprising an arm, pivotally connected to said frame and to said wheel carrying member on parallel axes disposed transversely of said frame, leaf springs acting between said frame and said members to yieldingly resist rising movement of said wheels, each leaf spring being vertically spaced from and substantially parallel to the plane of the associated arm and having a flexing length such that the spring forms with the arm a parallel link system, steering arms pivotally supported on said frame at opposite sides thereof, and a pair of links, each having articulated connection with one of said steering arms and the adjacent road wheel assembly to impart steering movement to the latter, the points of articulated connection of each link being so disposed that the link forms with the associated arm and spring a third member of the said parallel link system, whereby undesired steering displacement of the wheels as the latter rise and fall is avoided.

6. In a motor vehicle, the combination with a vehicle frame, of a steerable road wheel assembly supported on said frame for rising and falling movement and for steering movement with respect thereto, steering mechanism for said road wheel assembly including gearing, a steering gear housing carried by said frame and enclosing said gearing, a second housing carried by said gear housing, and shock absorbing mechanism within said second housing operatively connected to said wheel assembly to damp movement of the latter.

7. In a motor vehicle, the combination with a vehicle frame, of a steerable road wheel assembly supported on said frame for rising and falling movement and for steering movement with respect thereto, steering mechanism for said road wheel assembly including gearing, a steering gear housing carried by said frame and enclosing said gearing, and shock absorbing mechanism carried by said gear housing and operatively connected to said wheel to damp movement of the latter.

8. In a motor vehicle, the combination with a vehicle frame, of a steerable road wheel assembly supported on said frame for rising and falling movement and for steering movement with respect thereto, steering mechanism for said road wheel assembly including gearing, a steering gear housing carried by said frame and enclosing said gearing, and shock absorbing mechanism carried by said gear housing and operatively connected to said wheel to damp movement of the latter, said mechanism including an operating shaft journalled on said gear housing, and an arm carried by said shaft, said arm being operably connected to said wheel assembly and forming the principal support for the latter, and spring means yieldingly resisting rising movement of said arm and wheel.

FRANK C. BEST.